(12) United States Patent
Liu (10) Patent No.: US 10,757,686 B2
(45) Date of Patent: Aug. 25, 2020

(54) METHOD AND USER EQUIPMENT FOR REQUESTING COMMON INFORMATION FROM AN ACCESS NODE

(71) Applicant: China Academy of Telecommunications Technology, Beijing (CN)

(72) Inventor: Jiamin Liu, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 15/742,052

(22) PCT Filed: Jun. 13, 2016

(86) PCT No.: PCT/CN2016/085567
§ 371 (c)(1),
(2) Date: Jan. 5, 2018

(87) PCT Pub. No.: WO2017/005079
PCT Pub. Date: Jan. 12, 2017

(65) Prior Publication Data
US 2018/0192410 A1 Jul. 5, 2018

(30) Foreign Application Priority Data
Jul. 7, 2015 (CN) .......................... 2015 1 0395410

(51) Int. Cl.
*H04W 72/04* (2009.01)
*H04W 74/08* (2009.01)
*H04W 48/16* (2009.01)

(52) U.S. Cl.
CPC ....... *H04W 72/0406* (2013.01); *H04W 48/16* (2013.01); *H04W 72/048* (2013.01);
(Continued)

(58) Field of Classification Search
CPC ......... H04W 72/0406; H04W 74/0833; H04W 72/048; H04W 48/16; H04W 74/08;
(Continued)

(56) References Cited

U.S. PATENT DOCUMENTS

2008/0225823 A1* 9/2008 Tenny ................... H04W 48/12
370/345
2010/0027466 A1* 2/2010 Mustapha ............. H04W 48/14
370/328
(Continued)

FOREIGN PATENT DOCUMENTS

CN 101179756 A 5/2008
CN 101217689 A 7/2008
(Continued)

*Primary Examiner* — Un C Cho
*Assistant Examiner* — Lalita W Pace
(74) *Attorney, Agent, or Firm* — Kilpatrick Townsend & Stockton, LLP (57) ABSTRACT

Disclosed are a data transmission method, device, and system, which are used for resolving the problem of large overhead if an existing manner of sending a public message periodically is used in an ultra-dense network. The method comprises: user equipment sends an uplink request message, the uplink request message being used for requesting for obtaining public information of a first access node in an area in which the user equipment is located; and the user equipment receives the public information sent by the first access node. Because an access node in an area in which user equipment is located does not need to broadcast and send public information periodically, the access node can send, based on an uplink request of the user equipment, the public information, thereby improving the resource utilization and reducing the energy consumption.

6 Claims, 3 Drawing Sheets

(52) U.S. Cl.
CPC ....... *H04W 74/08* (2013.01); *H04W 74/0833* (2013.01); *Y02D 70/126* (2018.01); *Y02D 70/1262* (2018.01)

(58) Field of Classification Search
CPC ........... H04W 72/042; H04W 72/0446; H04W 72/0453; H04W 36/38; H04W 36/22; H04W 36/32; H04W 36/34; H04W 36/08; H04W 36/14; Y02D 70/1262; Y02D 70/126
See application file for complete search history.

(56) References Cited

U.S. PATENT DOCUMENTS

| | | | |
|---|---|---|---|
| 2011/0143759 A1* | 6/2011 | Choi | H04W 36/0055 455/444 |
| 2011/0182280 A1* | 7/2011 | Charbit | H04W 56/0045 370/350 |
| 2014/0269532 A1* | 9/2014 | Huang | H04W 74/0833 370/329 |
| 2015/0119054 A1* | 4/2015 | Morioka | H04W 76/10 455/450 |
| 2015/0139189 A1* | 5/2015 | Li | H04W 36/0055 370/331 |
| 2015/0358945 A1* | 12/2015 | Susitaival | H04W 48/16 370/329 |
| 2016/0128006 A1* | 5/2016 | Ji | H04W 48/14 370/350 |
| 2016/0227472 A1* | 8/2016 | Qiu | H04W 48/12 |
| 2016/0234759 A1* | 8/2016 | Kubota | H04W 48/14 |
| 2018/0077586 A1* | 3/2018 | Zhang | H04W 76/15 |
| 2018/0084408 A1* | 3/2018 | Huang | H04W 36/00 |
| 2018/0288683 A1* | 10/2018 | Bendlin | H04W 48/14 |

FOREIGN PATENT DOCUMENTS

| | | |
|---|---|---|
| CN | 102892198 A | 1/2013 |
| CN | 103249136 A | 8/2013 |
| CN | 103796315 A | 5/2014 |
| CN | 104205670 A | 12/2014 |
| EP | 2077692 A2 | 7/2009 |
| EP | 2157682 A1 | 5/2010 |
| WO | 2014150133 A1 | 9/2014 |

* cited by examiner

METHOD AND USER EQUIPMENT FOR REQUESTING COMMON INFORMATION FROM AN ACCESS NODE

This application is a National Stage of International Application No. PCT/CN2016/085567, filed Jun. 13, 2016, which claims the benefit of Chinese Patent Application No. 201510395410.5, filed with the Chinese Patent Office on Jul. 7, 2015, both of which are hereby incorporated by reference in their entireties.

FIELD

The present invention relates to the field of communications, and particularly to a method, device, and system for transmitting data.

BACKGROUND

In the existing mobile communication system, there are a plurality of User Equipment (UE) residing and provided with a connectivity service in a same cell, so various common information, e.g., a synchronization signal, a common reference signal, a cell broadcast information, etc., is frequently transmitted from the network side periodically. Taking system information in a Long Term Evolution (LTE) system as an example, the system information in the LTE system is categorized into a Master Information Block (MIB) and a plurality of System Information Blocks (SIBs), i.e., SIB1 to SIB15.

In future development of the mobile communication system, in order to better satisfy a user demand, and to improve a network capacity and throughput, more access nodes are sure to be introduced to an ultra-dense network in the future. Since there are a large number of access nodes in the ultra-dense network, if a common message is transmitted periodically as in the prior art, then there will be a considerable overhead of the system, and also the spectrum efficiency will be discouraged from being improved.

SUMMARY

Embodiments of the invention provide a method, device, and system for transmitting data so as to address the problem in the prior art that since there are a large number of access nodes in the ultra-dense network, if a common message is transmitted periodically as in the prior art, then there will be a considerable overhead of the system, and also the spectrum efficiency will be discouraged from being improved.

An embodiment of the invention provides a method for transmitting data, the method includes: transmitting, by a user equipment, an uplink request message, wherein the uplink request message requests for common information of a first access node in an area where the user equipment is located; and receiving, by the user equipment, the common information transmitted by the first access node.

Optionally receiving, by the user equipment, the common information transmitted by the first access node includes: receiving, by the user equipment, the common information transmitted by the first access node over a preset time-frequency resource; or receiving, by the user equipment, the common information transmitted by the first access node over a time-frequency resource scheduled by the first access node.

In an optional implementation, the user equipment is in a connected state, a second access node provides the user equipment with a communication service, and a coverage area of the second access node partially or completely overlaps with a coverage area of the first access node; and before the user equipment transmits the uplink request message, the method further includes: receiving, by the user equipment, control signaling transmitted by the second access node, wherein the control signaling instructs the user equipment to initiate an uplink request.

In this implementation, transmitting, by the user equipment, the uplink request message includes: transmitting, by the user equipment, the uplink request message according to preset configuration information; or transmitting, by the user equipment, the uplink request message according to configuration information in common information transmitted by the second access node; or transmitting, by the user equipment, the uplink request message according to configuration information carried in the controlling signaling; wherein the configuration information includes: a time-frequency resource for transmitting an uplink request, and parameter information to be used in transmitting the uplink request.

In this implementation, receiving, by the user equipment, the common information transmitted by the first access node includes: receiving, by the user equipment, the common information transmitted by the first access node over a preset time-frequency resource; or receiving, by the user equipment, the common information transmitted by the first access node over a time-frequency resource scheduled by the first access node; or receiving, by the user equipment, the common information transmitted by the first access node over a time-frequency resource scheduled by the second access node.

In another optional implementation, the user equipment is in an idle state; and the user equipment currently resides at a third access node, or the user equipment currently resides in a virtual cell including at least two third access nodes; and before the user equipment transmits the uplink request message, the method includes: receiving, by the user equipment, common information transmitted by the third access node, and obtain, from the received common information, privilege information indicating that the user equipment can initiate an uplink request in the area where it is currently located.

In this implementation, transmitting, by the user equipment, the uplink request message includes: transmitting, by the user equipment, the uplink request message, upon determining that a trigger condition is satisfied, wherein the trigger condition includes at least one of the following conditions: the user equipment needs to transmit traffic; the user equipment obtains the privilege information; traffic to be transmitted by the user equipment is preset traffic; the third access node cannot satisfy a traffic transmission demand of the user equipment; the user equipment has the capacity to initiate an uplink request; and a position of the user equipment is changed.

In this implementation, transmitting, by the user equipment, the uplink request message includes: transmitting, by the user equipment, the uplink request message at a preset periodicity.

Furthermore the method further includes: suspending, by the user equipment, the uplink request message from being transmitted, upon reception of the common information transmitted by the first access node; and upon determining that the position of the user equipment is changed, determining, by the user equipment, that the trigger condition is satisfied, and transmitting the uplink request message at the preset periodicity.

In this implementation, transmitting, by the user equipment, the uplink request message includes: transmitting, by the user equipment, the uplink request message according to preset configuration information; or transmitting, by the user equipment, the uplink request message according to configuration information in the common information transmitted by the third access node; wherein the configuration information includes: a time-frequency resource for transmitting an uplink request, and parameter information to be used in transmitting the uplink request.

In this implementation, receiving, by the user equipment, the common information transmitted by the first access node includes: receiving, by the user equipment, the common information transmitted by the first access node at a preset time-frequency resource; or receiving, by the user equipment, the common information transmitted by the first access node at a time-frequency resource scheduled by the first access node; or receiving, by the user equipment, the common information transmitted by the first access node at a time-frequency resource scheduled by the third access node.

Further to any one of the embodiments above, transmitting, by the user equipment, the uplink request message includes: transmitting, by the user equipment, the uplink request message via dedicated signaling; or transmitting, by the user equipment, the uplink request message via a message Msg1, wherein the message Msg1 is a first message in a random access procedure with contention.

Further to any one of the embodiments above, receiving, by the user equipment, the common information transmitted by the first access node includes: receiving, by the user equipment, the common information transmitted by the first access node via dedicated signaling; or receiving, by the user equipment, the common information transmitted by the first access node via a message Msg2; or receiving, by the user equipment, the common information transmitted by the first access node via a message Msg4; wherein the message Msg2 is a second message in a random access procedure with contention, and the message Msg4 is a fourth message in the random access procedure with contention.

Further to any one of the embodiments above, the uplink request message includes identification information identifying a type of common information requested by the user equipment.

An embodiment of the invention provides another method for transmitting data, the method including: receiving, by a first access node, an uplink request message transmitted by a user equipment, wherein the uplink request message requests for common information of a the first access node; and transmitting, by the first access node, the common information requested in the uplink request message.

Optionally receiving, by the first access node, the uplink request message transmitted by the user equipment includes: receiving, by the first access node, the uplink request message transmitted by the user equipment over a preset time-frequency resource; or receiving, by the first access node, the uplink request message transmitted by the user equipment over a time-frequency resource indicated by a second access node, wherein the second access node is an access node currently providing the user equipment with a communication service; or receiving, by the first access node, the uplink request message transmitted by the user equipment over a time-frequency resource indicated by a third access node, wherein the third access node is an access node where the user equipment currently resides.

Optionally receiving, by the first access node, the uplink request message transmitted by the user equipment includes: receiving, by the first access node, the uplink request message transmitted by the user equipment via dedicated signaling; or receiving, by the first access node, the uplink request message transmitted by the user equipment via a message Msg1, wherein the message Msg1 is a first message in a random access procedure with contention.

Optionally transmitting, by the first access node, the common information requested in the uplink request message includes: transmitting, by the first access node, the common information requested in the uplink request message to the user equipment; or transmitting, by the first access node, the common information requested in the uplink request message by broadcasting the common information.

Optionally transmitting, by the first access node, the common information requested in the uplink request message includes: transmitting, by the first access node, the common information requested in the uplink request message via dedicated signaling; or transmitting, by the first access node, the common information requested in the uplink request message via a message Msg2; or transmitting, by the first access node, the common information requested in the uplink request message via a message Msg4; wherein the message Msg2 is a second message in a random access procedure with contention, and the message Msg4 is a fourth message in the random access procedure with contention.

Optionally the method further includes: scheduling, by the first access node, for the user equipment a time-frequency resource for the user equipment to receive the common information.

An embodiment of the invention provides a user equipment including: a transmitting module configured to transmit an uplink request message, wherein the uplink request message requests for common information of a first access node in an area where the user equipment is located; and a receiving module configured to receive the common information transmitted by the first access node.

In an optional implementation, the user equipment is in a connected state, a second access node provides the user equipment with a communication service, and a coverage area of the second access node partially or completely overlaps with a coverage area of the first access node; and the receiving module is further configured: to receive control signaling transmitted by the second access node, wherein the control signaling instructs the user equipment to initiate an uplink request.

In this implementation, the transmitting module is configured: to transmit the uplink request message according to preset configuration information; or to transmit the uplink request message according to configuration information in common information transmitted by the second access node; or to transmit the uplink request message according to configuration information carried in the controlling signaling; wherein the configuration information includes: a time-frequency resource for transmitting an uplink request, and parameter information to be used in transmitting the uplink request.

In this implementation, the receiving module is configured: to receive the common information transmitted by the first access node over a preset time-frequency resource; or to receive the common information transmitted by the first access node over a time-frequency resource scheduled by the first access node; or to receive the common information transmitted by the first access node over a time-frequency resource scheduled by the second access node.

In another optional implementation, the user equipment is in an idle state; and the user equipment currently resides at a third access node, or the user equipment currently resides in a virtual cell including at least two third access nodes; and the receiving module is further configured: to receive common information transmitted by the third access node, and to obtain, from the received common information, privilege information indicating that the user equipment can initiate an uplink request in the area wherein it is currently located.

In this implementation, the user equipment further includes: a processing module configured to trigger the transmitting module to transmit the uplink request message, upon determining that a trigger condition is satisfied, wherein the trigger condition includes at least one of the following conditions: the user equipment needs to transmit traffic; the user equipment obtains the privilege information; traffic to be transmitted by the user equipment is preset traffic; the third access node cannot satisfy a traffic transmission demand of the user equipment; the user equipment has the capacity to initiate an uplink request; and a position of the user equipment is changed.

In this implementation, the transmitting module is configured to transmit the uplink request message at a preset periodicity.

Furthermore the user equipment further includes: a processing module configured to trigger the transmitting module to suspend the uplink request message from being transmitted, after the receiving module receives the common information transmitted by the first access node; and upon determining that the position of the user equipment is changed, to determine that the trigger condition is satisfied, and to trigger the transmitting module to transmit the uplink request message at the preset periodicity.

In this implementation, the transmitting module is configured: to transmit the uplink request message according to preset configuration information; or to transmit the uplink request message according to configuration information in the common information transmitted by the third access node; wherein the configuration information includes: a time-frequency resource for transmitting an uplink request, and parameter information to be used in transmitting the uplink request.

In this implementation, the receiving module is configured: to receive the common information transmitted by the first access node at a preset time-frequency resource; or to receive the common information transmitted by the first access node at a time-frequency resource scheduled by the first access node; or to receive the common information transmitted by the first access node at a time-frequency resource scheduled by the third access node.

In this implementation, the transmitting module is configured: to transmit the uplink request message via dedicated signaling; or to transmit the uplink request message via a message Msg1, wherein the message Msg1 is a first message in a random access procedure with contention.

Further to any one of the embodiments above, the receiving module is configured: to receive the common information transmitted by the first access node via dedicated signaling; or to receive the common information transmitted by the first access node via a message Msg2; or to receive the common information transmitted by the first access node via a message Msg4; wherein the message Msg2 is a second message in a random access procedure with contention, and the message Msg4 is a fourth message in the random access procedure with contention.

An embodiment of the invention provides an access node including: a receiving module configured to receive an uplink request message transmitted by a user equipment, wherein the uplink request message requests for common information of the access node including the receiving module; and a transmitting module configured to transmit the common information requested in the uplink request message.

Optionally the receiving module is configured: to receive the uplink request message transmitted by the user equipment over a preset time-frequency resource; or to receive the uplink request message transmitted by the user equipment over a time-frequency resource indicated by a second access node, wherein the second access node is an access node currently providing the user equipment with a communication service; or to receive the uplink request message transmitted by the user equipment over a time-frequency resource indicated by a third access node, wherein the third access node is an access node where the user equipment currently resides.

Optionally the receiving module is configured: to receive the uplink request message transmitted by the user equipment via dedicated signaling; or to receive the uplink request message transmitted by the user equipment via a message Msg1, wherein the message Msg1 is a first message in a random access procedure with contention.

Optionally the transmitting module is configured: to transmit the common information requested in the uplink request message to the user equipment; or to transmit the common information requested in the uplink request message by broadcasting the common information.

Optionally the transmitting module is configured: to transmit the common information requested in the uplink request message via a message Msg2; or to transmit the common information requested in the uplink request message via a message Msg4; wherein the message Msg2 is a second message in a random access procedure with contention, and the message Msg4 is a fourth message in the random access procedure with contention.

Optionally the access node further includes: a resource scheduling module configured to schedule for the user equipment a time-frequency resource for the user equipment to receive the common information.

An embodiment of the invention provides another user equipment including a receiver, a transmitter, and at least one processor connected respectively with the receiver and the transmitter, wherein: the transmitter is configured to transmit an uplink request message, wherein the uplink request message requests for common information of a first access node in an area where the user equipment is located; and the receiver is configured to receive the common information transmitted by the first access node.

In an optional implementation, the user equipment is in a connected state, a second access node provides the user equipment with a communication service, and a coverage area of the second access node partially or completely overlaps with a coverage area of the first access node; and the receiver is further configured: to receive control signaling transmitted by the second access node, wherein the control signaling instructs the user equipment to initiate an uplink request.

In this implementation, the transmitter is configured: to transmit the uplink request message according to preset configuration information; or to transmit the uplink request message according to configuration information in common information transmitted by the second access node; or to transmit the uplink request message according to configuration information carried in the controlling signaling; wherein the configuration information includes: a time-frequency resource for transmitting an uplink request, and parameter information to be used in transmitting the uplink request.

In this implementation, the receiver is configured: to receive the common information transmitted by the first access node over a preset time-frequency resource; or to receive the common information transmitted by the first access node over a time-frequency resource scheduled by the first access node; or to receive the common information transmitted by the first access node over a time-frequency resource scheduled by the second access node.

In another optional implementation, the user equipment is in an idle state; and the user equipment currently resides at a third access node, or the user equipment currently resides in a virtual cell including at least two third access nodes; and the receiver is further configured: to receive common information transmitted by the third access node, and to obtain, from the received common information, privilege information indicating that the user equipment can initiate an uplink request in the area wherein it is currently located.

In this implementation, the processor is configured to transmit the uplink request message, upon determining that a trigger condition is satisfied, wherein the trigger condition includes at least one of the following conditions: the user equipment needs to transmit traffic; the user equipment obtains the privilege information; traffic to be transmitted by the user equipment is preset traffic; the third access node cannot satisfy a traffic transmission demand of the user equipment; the user equipment has the capacity to initiate an uplink request; and a position of the user equipment is changed.

In this implementation, the transmitter is configured to transmit the uplink request message at a preset periodicity.

Furthermore the user equipment further includes: a processor configured to trigger the transmitter to suspend the uplink request message from being transmitted, after the receiver receives the common information transmitted by the first access node; and upon determining that the position of the user equipment is changed, to determine that the trigger condition is satisfied, and to trigger the transmitter to transmit the uplink request message at the preset periodicity.

In this implementation, the transmitter is configured: to transmit the uplink request message according to preset configuration information; or to transmit the uplink request message according to configuration information in the common information transmitted by the third access node; wherein the configuration information includes: a time-frequency resource for transmitting an uplink request, and parameter information to be used in transmitting the uplink request.

In this implementation, the receiver is configured: to receive the common information transmitted by the first access node at a preset time-frequency resource; or to receive the common information transmitted by the first access node at a time-frequency resource scheduled by the first access node; or to receive the common information transmitted by the first access node at a time-frequency resource scheduled by the third access node.

In this implementation, the transmitter is configured: to transmit the uplink request message via dedicated signaling; or to transmit the uplink request message via a message Msg1, wherein the message Msg1 is a first message in a random access procedure with contention.

Further to any one of the embodiments above, the receiver is configured: to receive the common information transmitted by the first access node via dedicated signaling; or to receive the common information transmitted by the first access node via a message Msg2; or to receive the common information transmitted by the first access node via a message Msg4; wherein the message Msg2 is a second message in a random access procedure with contention, and the message Msg4 is a fourth message in the random access procedure with contention.

An embodiment of the invention provides another access node including a receiver, a transmitter, and at least one processor connected respectively with the receiver and the transmitter, wherein: a receiver configured to receive an uplink request message transmitted by a user equipment, wherein the uplink request message requests for common information of the access node including the receiver; and a transmitter configured to transmit the common information requested in the uplink request message.

Optionally the receiver is configured: to receive the uplink request message transmitted by the user equipment over a preset time-frequency resource; or to receive the uplink request message transmitted by the user equipment over a time-frequency resource indicated by a second access node, wherein the second access node is an access node currently providing the user equipment with a communication service; or to receive the uplink request message transmitted by the user equipment over a time-frequency resource indicated by a third access node, wherein the third access node is an access node where the user equipment currently resides.

Optionally the receiver is configured: to receive the uplink request message transmitted by the user equipment via dedicated signaling; or to receive the uplink request message transmitted by the user equipment via a message Msg1, wherein the message Msg1 is a first message in a random access procedure with contention.

Optionally the transmitter is configured: to transmit the common information requested in the uplink request message to the user equipment; or to transmit the common information requested in the uplink request message by broadcasting the common information.

Optionally the transmitter is configured: to transmit the common information requested in the uplink request message via a message Msg2; or to transmit the common information requested in the uplink request message via a message Msg4; wherein the message Msg2 is a second message in a random access procedure with contention, and the message Msg4 is a fourth message in the random access procedure with contention.

Optionally the processor is configured to schedule for the user equipment a time-frequency resource for the user equipment to receive the common information.

An embodiment of the invention provides a communication system including: a user equipment configured to transmit an uplink request message, wherein the uplink request message requests for common information of a first access node in an area where the user equipment is located; and to receive the common information transmitted by the first access node; and the first access node configured to receive the uplink request message transmitted by the user equipment, wherein the uplink request message requests for the common information of the first access node; and to transmit the common information requested in the uplink request message.

In an optional implementation, if the user equipment is in a connected state, then the system will further include: a second access node currently providing the user equipment with a communication service, configured to transmit control signaling to the user equipment upon determining that at least one trigger condition is satisfied: and the user equipment is configured to transmit the uplink request message upon reception of the control signaling transmitted by the second access node; wherein the at least one trigger condition includes: the second access node determines that there is the first access node in the area where the user equipment is located; the second access node determines that it cannot satisfy a traffic transmission demand of the user equipment; and the second access node receives a report message of the first access node in the area where the user equipment is located, wherein the report message indicates that the user equipment is located in a coverage area of the first access node.

In the method, device, and system for obtaining triggered common information according to the embodiments of the invention, a user equipment transmits an uplink request message, and the user equipment receives common information transmitted by a first access node. Since the access node in an area where the user equipment is located will not broadcast any common information periodically, but may transmit the common information in response to the uplink request of the user equipment, the utilization ratio of resources can be improved, and power consumption can be lowered.

DETAILED DESCRIPTION OF THE EMBODIMENTS

The embodiments of the invention will be described below in further details with reference to the drawings. It shall be appreciated that the embodiments described here are merely intended to illustrate and explain the invention, but not to limit the invention thereto.

Figure 1:
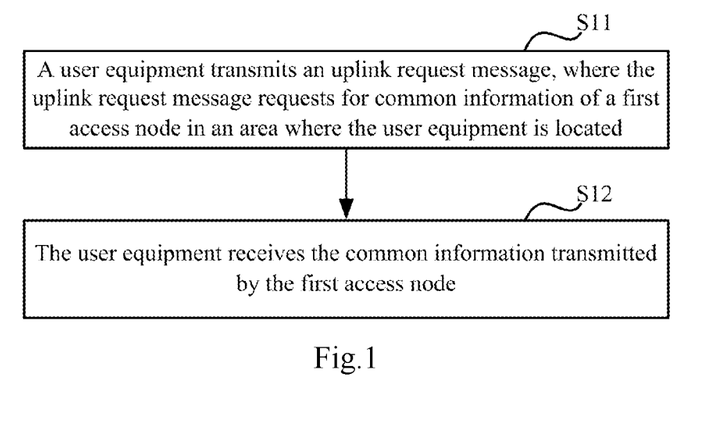
FIG. 1 is a schematic flow chart of a method for transmitting data at a user equipment side according to an embodiment of the invention.

As illustrated in FIG. 1, an embodiment of the invention provides a method for transmitting data at a user equipment side, where the method includes the following steps.

In the step S11, a user equipment transmits an uplink request message, where the uplink request message requests for common information of a first access node in an area where the user equipment is located.

In the step S12, the user equipment receives the common information transmitted by the first access node.

A method for obtaining triggered common information according to an embodiment of the invention includes: transmitting, by the user equipment, the uplink request message, and receiving, by the user equipment, the common information transmitted by the first access node. Since the access node in the area where the user equipment is located will not broadcast any common information periodically, but may transmit the common information in response to the uplink request of the user equipment, the utilization ratio of resources can be improved, and power consumption can be lowered.

After the step S12, the user equipment can establish a connection with the first access node based upon the obtained common information of the first access node, and transmit traffic.

In the embodiment of the invention, the common information includes at least one of the following information.

General information, e.g., operating frequency information, bandwidth information, channel configuration information, carrier configuration information, etc.

Policy information, e.g., cell reselection information, access service information, etc.

Measurement information, e.g., synchronization signal information, common measurement configuration, etc.

There are the following application scenarios of the embodiment of the invention.

In a first scenario, the area where the user equipment is located is a uni-coverage area, that is, there is only one access node in the area where the user equipment is located, and at this time, the first access node is the access node in the area where the user equipment is located.

In this scenario, the first access node can be a macro eNB, a relay node, or another conventional access node, or can be a micro eNB, a pico eNB, a home eNB or a femto eNB, or another access node providing a hotspot service.

In this scenario, the user equipment initiates the uplink request on its own initiative.

In this scenario, there are two states of the user equipment: a connected state and an idle state, where the user equipment in a connected state generally refers to the user equipment which has established a Radio Resource Control (RRC) connection with the access node at the network side, and the user equipment in an idle state generally refers to the user equipment which has not established an RRC connection with any access node at the network side.

If the user equipment is in a connected state, then the first access node will be a node currently providing the user equipment with a communication service; and if the user equipment is in an idle state, then the first access node will a node where the user equipment currently resides.

In an implementation, the step S11 particularly includes follows.

The user equipment transmits the uplink request message according to preset configuration information.

Where the configuration information includes: a time-frequency resource for transmitting an uplink request, and parameter information to be used in transmitting the uplink request.

By way of an example, the parameter information to be used in transmitting the uplink request includes but will not be limited to at least one of the following information: power information for transmitting an uplink request message, and format information for transmitting the uplink request message.

In an implementation, particularly in the step S11, the user equipment transmits the uplink request message via dedicated signaling, or the user equipment transmits the uplink request message via a message a (Msg1).

Particularly the user equipment can transmit the uplink request message via dedicated signaling, or can transmit the uplink request message via existing signaling, that is, the user equipment can transmit the uplink request message by incorporating the uplink request message into the existing signaling, and transmit the uplink request message. By way of an example, if the user equipment transmits the uplink request message via an Msg1, then the Msg1 will request for the common information of the first access node in the area where the user equipment is located, in addition to an uplink grant, and synchronization.

The Msg1 is a first message in a random access procedure with contention, and it shall be noted that the random access procedure with contention of the UE generally includes the following four steps.

1: The UE selects a random access preamble and a Physical Random Access Channel (PRACH) resource, and transmits the selected random access preamble, i.e., Msg1, to the eNB over the PRACH resource.

2. The eNB receives the preamble, calculates a Timing Advance (TA), and transmits a random access response to the UE, where the random access response at least includes information about the timing advance, and an uplink (UL) grant for Msg3, i.e., Msg2.

3. The UE transmits uplink transmission, i.e., the Msg3, over the UL grant specified in the Msg2, where there are different contents of uplink transmission in the Msg3 as there is a varying random access reason, for example, an RRC Connection Setup Request is transmitted in the Msg3 for an initial access.

4. The eNB transmits a contention resolution message, i.e., Msg4, to the UE. The UE can determine from the Msg4 whether the random access succeeds.

In an implementation, in some embodiments, particularly in the step S12, the UE receives the common information transmitted by the first access node over a preset time-frequency resource; or the UE receives the common information transmitted by the first access node over a time-frequency resource scheduled by the first access node.

In an implementation, in some further embodiments, particularly in the step S12, the UE receives the common information transmitted by the first access node via dedicated signaling; or the UE receives the common information transmitted by the first access node via the Msg2; or the UE receives the common information transmitted by the first access node via the Msg4.

Particularly the first access node can transmit the common information via the dedicated signaling, or can transmit the common information via the existing signaling, that is, the user equipment can transmit the common information by incorporating the common information into the existing signaling.

In a second scenario, the area where the user equipment is located is a multi-level coverage area, that is, there are at least two access nodes in the area where the user equipment is located.

In this scenario, there are two states of the user equipment: a connected state and an idle state.

I. If the user equipment is in a connected state, then a second access node will be an access node currently providing the user equipment with a communication service, the first access node will be a different access node from the second access node in the area where the user equipment is located, a coverage area of the first access node partially or completely overlaps with a coverage area of the second access node, and the user equipment is located in an overlapping area between the first access node and the second access node.

By way of an example, the first access node is a macro eNB, a relay node, or another conventional access node; or the second access node can be a conventional access node, or can be a micro eNB, a pico eNB, a home eNB or a femto eNB, or another access node providing a hotspot service.

By way of an example, the second access node can transmit common information of the second access node periodically.

In this embodiment, in order to avoid the user equipment from initiating an uplink request frequently, the user equipment is controlled by the second access node to initiate an uplink request.

In an implementation, before the step S11, the method further includes: receiving, by the user equipment, control signaling transmitted by the second access node, where the control signaling instructs the user equipment to initiate an uplink request.

Particularly the user equipment transmits the uplink request message in the area where the user equipment is located, upon reception of the control signaling transmitted by the second access node.

In an implementation, the second node transmits the controlling signaling to the user equipment upon determining that at least one of the trigger conditions is satisfied.

The second access node determines that there is the first access node in the area where the user equipment is located.

The second access node determines that it cannot satisfy a traffic transmission demand of the user equipment.

The second access node receives a report message of the first access node in the area where the user equipment is located, where the report message indicates that the user equipment is located in the coverage area of the first access node.

In an implementation, the step S11 particularly includes follows.

The user equipment transmits the uplink request message according to preset configuration information; or the user equipment transmits the uplink request message according to configuration information in common information transmitted by the second access node; or the user equipment transmits the uplink request message according to configuration information carried in control signaling, where the configuration information includes: a time-frequency resource for transmitting an uplink request, and parameter information to be used in transmitting the uplink request.

In an implementation, particularly in the step S11: the user equipment transmits the uplink request message via dedicated signaling.

Of course, the user equipment can alternatively transmit the uplink request message via the existing signaling, that is, the user equipment can transmit the uplink request message by incorporating the uplink request message into the existing signaling.

In an implementation, particularly in the step S12: the user equipment receives the common information transmitted by the first access node over a preset time-frequency resource; or the user equipment receives the common information transmitted by the first access node over a time-frequency resource scheduled by the first access node; or the user equipment receives the common information transmitted by the first access node over a time-frequency resource scheduled by the second access node.

In an implementation, particularly in the step S12: the user equipment receives the common information transmitted by the first access node via dedicated signaling.

Of course, the user equipment can alternatively receive the common information via the existing signaling, that is, the first access node can transmit the common information by incorporating the common information into the existing signaling while transmitting the common information.

II. The user equipment is in an idle state; and in this embodiment, furthermore the user equipment initiates the uplink request on its own initiative in the following two scenarios.

In a first scenario, the user equipment currently resides at a third access node, where the third access node can be a macro eNB, a relay node, or another conventional access node, or can be a micro eNB, a pico eNB, a home eNB or a femto eNB, or another access node providing a hotspot service.

By way of an example, the third access node can transmit common information of the third access node periodically, where the common information can include privilege information indicating that the user equipment can initiate an uplink request in the area where it is currently located, and configuration information.

In a second scenario, the user equipment currently resides in a virtual cell including at least two third access nodes, where the third access nodes are micro eNBs, pico eNBs, home eNBs or femto eNBs, or other access nodes providing a hotspot service. In this scenario, the first access node can be one of the third access nodes in the virtual cell, that is, the user equipment can obtain the common information of the third access node in the virtual cell where it resides.

By way of an example, at least one of the third access nodes in the virtual cell transmits common information of the third access node periodically, where the common information can include privilege information indicating that the user equipment can initiate an uplink request in the area where it is currently located, and configuration information.

In the first scenario or the second scenario above, in an implementation, before the step S11, the method further includes follows.

The user equipment receives the common information transmitted by the third access node, and obtains, from the received common information, the privilege information indicating that the user equipment can initiate an uplink request in the area where it is currently located.

Particularly in order to avoid the user equipment from initiating an uplink request frequently, the user equipment can initiate an uplink request only after it obtains the privilege information.

In the first scenario or the second scenario above, in an optional implementation, the step S11 particularly includes follows.

The user equipment transmits the uplink request message upon determining that a trigger condition is satisfied, where the trigger condition includes at least one of the following conditions.

A. The User Equipment Needs to Transmit Traffic.

Particularly the user equipment can initiate the uplink request immediately before it initiates traffic transmission, to obtain the common information of the first access node so as to prepare for being subsequently connected with the first access node, and transmitting high-rate traffic over a resource of the first access node.

B. The user equipment obtains the privilege information.

Particularly the user equipment initiates the uplink request immediately upon obtaining the privilege information, and this means that the user equipment needs to search its surrounding communication range for a hidden first access node.

C. Traffic to be transmitted by the user equipment is preset traffic.

By way of an example, the traffic to be transmitted by the user equipment is wideband traffic.

D. The third access node cannot satisfy a traffic transmission demand of the user equipment.

By way of an example, there is such a limited bandwidth or a high load of the third access node where the user equipment currently resides that the third access node cannot support traffic transmission of the user equipment.

E. The user equipment has the capacity to initiate an uplink request.

F. The position of the user equipment is changed.

In another optional implementation, the step S11 particularly includes follows.

The user equipment transmits the uplink request message at a preset periodicity.

Furthermore optionally the method further includes follows.

The user equipment suspends the uplink request message from being transmitted, upon reception of the common information transmitted by the first access node.

The user equipment determines that the trigger condition is satisfied, upon determining that the position of the user equipment is changed, and transmits the uplink request message at a preset periodicity.

Particularly the user equipment can transmit the uplink request message periodically in a privilege area, that is, the user equipment searches its surrounding communication range constantly for a first access node which is hidden and available, and a condition can be further preset, so if the user equipment receives the common information of the first access node, then the user equipment will not transmit any uplink request message periodically unless the position of the user equipment is changed.

In the first scenario or the second scenario above, the step S11 particularly includes follows.

The user equipment transmits the uplink request message via dedicated signaling; or the user equipment transmits the uplink request message via Msg1.

In the first scenario or the second scenario above, the step S11 particularly includes follows.

The user equipment transmits the uplink request message according to preset configuration information; or the user equipment transmits the uplink request message according to configuration information in the common information transmitted by the third access node.

Where the configuration information includes: a time-frequency resource for transmitting an uplink request, and parameter information to be used in transmitting the uplink request.

In the first scenario or the second scenario above, the step S12 particularly includes follows.

The user equipment receives the common information transmitted by the first access node over a preset time-frequency resource; or the user equipment receives the common information transmitted by the first access node over a time-frequency resource scheduled by the first access node; or the user equipment receives the common information transmitted by the first access node over a time-frequency resource scheduled by the third access node.

In the first scenario or the second scenario above, the step S12 particularly includes follows.

The user equipment receives the common information transmitted by the first access node via dedicated signaling; or the user equipment receives the common information transmitted by the first access node via Msg2; or the user equipment receives the common information transmitted by the first access node via Msg4.

Further to any one of the embodiments above, the uplink request message transmitted by the user equipment includes identification information identifying a type of common information requested by the user equipment.

By way of an example, different serial numbers represent different types of common information to thereby better satisfy differentiated service demands. For example, the serial number 1 represents general access information, e.g., operating frequency information, bandwidth information, channel configuration information, carrier configuration information, etc., of the first access node; the serial number 2 represents policy information; the serial number 3 represents measurement information, etc.

Figure 2:
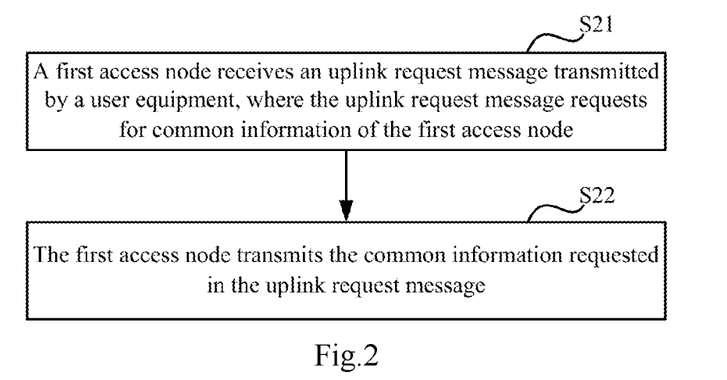
FIG. 2 is a schematic flow chart of a method for transmitting data at an access node side according to an embodiment of the invention.

Based upon the same inventive idea, an embodiment of the invention further provides a method for transmitting data at an access node side, and as illustrated in FIG. 2, the method includes the following steps.

In the step S21, a first access node receives an uplink request message transmitted by a user equipment, where the uplink request message requests for common information of the first access node.

In the step S22, the first access node transmits the common information requested in the uplink request message.

In an implementation, the step S21 particularly includes follows.

The first access node receives the uplink request message transmitted by the user equipment over a preset time-frequency resource; or the first access node receives the uplink request message transmitted by the user equipment over a time-frequency resource indicated by a second access node, where the second access node is an access node currently providing the user equipment with a communication service; or the first access node receives the uplink request message transmitted by the user equipment over a time-frequency resource indicated by a third access node, where the third access node is an access node where the user equipment currently resides.

Further to any one of the embodiments above, the step S21 particularly includes follows.

The first access node receives the uplink request message transmitted by the user equipment via dedicated signaling; or the first access node receives the uplink request message transmitted by the user equipment via Msg1.

Further to any one of the embodiments above, the step S22 is performed particularly in the following two implementations.

In a first implementation, the first access node transmits the common information requested in the uplink request message to the user equipment.

By way of an example, the first access node scrambles the transmitted common information using an identifier specific to the user equipment, e.g., a Cell-Radio Network Temporary Identifier (C-RNTI), etc., so that only the user equipment can parse the common information correctly.

In a second implementation, the first access node transmits the common information requested in the uplink request message by broadcasting the common information.

In order to enable a larger number of user equipment to receive the common information of the first access node, the first access node can transmit the common information requested in the uplink request message by broadcasting the common information.

By way of an example, the first access node scrambles the transmitted common information using a common identifier, e.g., a System Information-Radio Network Temporary Identifier (SI-RNTI), etc.

Further to any one of the embodiments above, the step S22 particularly includes follows.

The first access node transmits the common information requested in the uplink request message via dedicated signaling; or the first access node transmits the common information requested in the uplink request message via Msg2; or the first access node transmits the common information requested in the uplink request message via Msg4.

Further to any one of the embodiments above, the method further includes follows.

The first access node schedules for the user equipment a time-frequency resource for the user equipment to receive the common information.

Particularly if the first access node transmits the common information to only the user equipment transmitting the uplink request message, then the position of the scheduled time-frequency resource will only be associated with a time-frequency resource for the user equipment to transmit a previous uplink request, for example, if the uplink request of the user equipment is transmitted in the k-th sub-frame, then a reception window may be defined as an sub-frame interval of [k+4, k+10]; and if the first access node transmits the common information by broadcasting the common information, then the time-frequency resource will be scheduled so that the common information is transmitted at a common detection position at which surrounding user equipment detect broadcasted information.

The methods for transmitting data according to the embodiments of the invention will be described below from the perspective of an interaction process between the user equipment and the access node in three particular embodiments thereof.

In a first embodiment, the UE is in a connected state, and when a serving cell of the UE (i.e., the second access node) preliminarily determines that there is a resource of a small station node (i.e., the first access node) available around the UE, due to a load condition, a higher bandwidth required for traffic of the UE, a determination position of the UE, etc., the serving cell can transmit control signaling to the UE to instruct the UE to initiate a common information requesting procedure, particularly as follows.

0: The serving cell of the UE judges against a trigger condition, and decides to trigger a common information requesting procedure of the UE.

1: The serving cell of the UE transmits control signaling to the UE to indicate that the UE can initiate an uplink request, where the control signaling includes configuration information of an uplink request.

2. The UE receives the control signaling, and transmits an uplink request message at a specific position according to the instruction of the service cell.

3. The small station node receives the uplink request message transmitted by the UE at a corresponding resource position.

By way of an example, the resource position may be a pre-configured pool of time-frequency resources, or may be notified to the small station node by the serving cell as a result of interaction.

4. The small station node transmits its common information according to what is requested by the UE, upon reception of the uplink request message of the UE.

By way of an example, the common information can be transmitted by transmitting the common information to only the UE, or broadcasting the common information.

5. The UE receives the common information in a corresponding reception positional area. The UE receiving the common information of the small station node can subsequently establish a connection with the small station node, and access a data transmission service over the resource of the small station node.

By way of an example, the reception position may be a pre-configured pool of time-frequency resources, or may be a time-frequency resource scheduled by the serving cell for the UE, or may be a time-frequency resource scheduled by the small station node for the UE.

In a second embodiment, the UE is in an idle state, and resides in a traditional cell, and the UE reads system information of the traditional cell normally. Privilege information and configuration information for the UE to make an uplink request can be included in the traditional cell as a result of network planning, or pre-configuration for Operation, Administration and maintenance (OAM). The UE reads the configuration information of an uplink request, and initiates an uplink request when a trigger condition is satisfied, to obtain common information of a small station node, particularly as follows.

0. The UE reads the privilege information and the configuration information for an uplink request, in the common information broadcasted in the traditional cell.

1. If the UE needs to transmit traffic, then the UE will transmit an uplink request message upon determining that the trigger condition is satisfied, to request for common information of a surrounding small station node, where the trigger condition can include follows.

The UE needs to transmit traffic in a high bandwidth; there is such a limited bandwidth or a high load of the current cell of the UE that the cell cannot support traffic of the UE; there is a high transmission capacity of the UE, e.g., a support of a high frequency band, a high bandwidth, etc.; and the UE in a high version can support the function of initiating an uplink request.

By way of an example, the uplink request procedure can be performed together with a connection setup procedure of the UE, for example, the uplink request message includes both a Connection Setup Request and a Common Information Request, or Msg1 for a random access can also functionally indicate a Common Information Request.

2. The small station node transmits its common information upon reception of the uplink request message of the UE.

By way of an example, if the UE requests for only the common information, then the small station node will feed its common information back to the UE separately, or broadcast its common information.

If the UE also requests for a connection setup procedure, then the small station node will also feed back the setup of a connection because the feedback specific to the UE needs to be transmitted to the UE separately.

3. The UE receives the common information of the small station node, and obtains general configuration information of the small station node to thereby facilitate subsequent connection and communication with the small station node.

By way of an example, the general configuration information can include follows.

An operating frequency and bandwidth of the small station node, and other general configuration information of the small station node; policy information of the small station node, e.g., access information, information about various parameters, etc., and measurement information of the small station node.

In a third embodiment, the UE is in an idle state, and the UE resides at a frequency of a small station, or in a virtual cell including small station nodes. In order to save energy and resources, only a part of the small station nodes may transmit common information periodically in an idle state, and transmitted common information may be a small amount of information as a result of fresh optimization and designing.

If the UE needs to obtain further detailed information, e.g., specific configuration information of the respective small station nodes, measurement signal information of the respective small station nodes, etc., then the UE will make an uplink request on its own initiative when a trigger condition is satisfied, and furthermore the small station nodes will transmit the information.

For example, in the virtual cell including the small station nodes, there may be only a traditional cell at 20 MHz visible to the UE in an idle state, and common information of the cell in an idle state will be transmitted concurrently by all the small station nodes in synchronization, so the cell appears a large traditional cell to the UE. However there are additional transmission resources in other spare bandwidths of the respective small station nodes, and the UE can transmit data over these transmission resources. When the UE is in an idle state, the UE can simply reside in the virtual cell, and if the UE needs to transmit data, then the UE may further get knowledge of detailed common information of the small station nodes in the virtual cell, e.g., those frequencies and bandwidths supported by the respective small station nodes, specific configurations of the small station nodes, how to transmit reference signals of the small station nodes, etc., and the knowledge of such detailed common information can enable the UE to better measure the surrounding small station nodes, so that an appropriate service cell and service resource can be subsequently selected according to the capacity and the traffic demand of the UE. The UE initiates an uplink request for the detailed common information of the small station nodes particularly as follows.

0: The UE obtains the privilege information of an uplink request from the received common information transmitted periodically by the small station nodes in the virtual cell, that is, the UE can transmit an uplink request for common information of the small station nodes at the position of the UE. Also the UE obtains the configuration information for an uplink request from the common information.

1. When the UE needs to obtain the detailed common information of the small station nodes in the area where the UE is located, the UE can transmit an uplink request message as required in the obtained configuration information.

The UE generally needs to obtain the detailed common information of the adjacent small station nodes when the UE has a demand for transmitting data, and even only when the UE has a demand for transmitting a large amount of data, but the UE can alternatively be triggered by another demand thereof to transmit the uplink request message.

2. The adjacent small station nodes receive the uplink request message of the UE, and transmit the common information required for the UE according to what is requested in the message.

3. The UE receives the common information for the UE to subsequently transmit data at a high rate over resources of the small station nodes.

The processing flow of the methods above can be performed in software program which can be stored in a storage medium, and when the stored software program is invoked, the software program performs the steps in the methods above.

Figure 3:
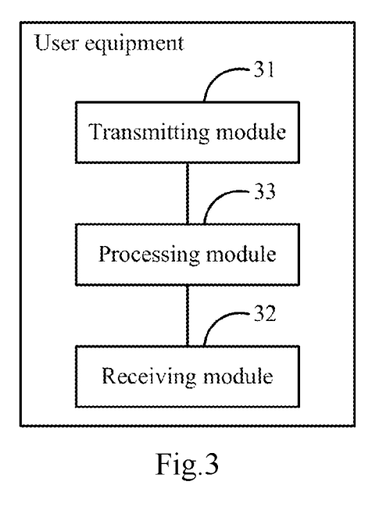
FIG. 3 is a schematic structural diagram of a first user equipment according to an embodiment of the invention.

FIG. 3 illustrates a user equipment according to an embodiment of the invention, which can perform the method according to the embodiment of the invention as illustrated in FIG. 1, and as illustrated in FIG. 3, the user equipment includes: a transmitting module 31 is configured to transmit an uplink request message, where the uplink request message requests for common information of a first access node in an area where the user equipment is located; and a receiving module 32 is configured to receive the common information transmitted by the first access node.

In an optional implementation, the user equipment is in a connected state, a second access node provides the user equipment with a communication service, and a coverage area of the second access node partially or completely overlaps with a coverage area of the first access node; and the receiving module 32 is further configured to receive control signaling transmitted by the second access node, where the control signaling instructs the user equipment to initiate an uplink request.

In this implementation, the transmitting module 31 is configured to transmit the uplink request message according to preset configuration information; or to transmit the uplink request message according to configuration information in common information transmitted by the second access node; or to transmit the uplink request message according to configuration information carried in the controlling signaling; where the configuration information includes: a time-frequency resource for transmitting an uplink request, and parameter information to be used in transmitting the uplink request.

In this implementation, the receiving module 32 is configured to receive the common information transmitted by the first access node over a preset time-frequency resource; or to receive the common information transmitted by the first access node over a time-frequency resource scheduled by the first access node; or to receive the common information transmitted by the first access node over a time-frequency resource scheduled by the second access node.

In another optional implementation, the user equipment is in an idle state; and the user equipment currently resides at a third access node, or the user equipment currently resides in a virtual cell including at least two third access nodes.

The receiving module 32 is further configured: to receive common information transmitted by the third access node, and to obtain, from the received common information, privilege information indicating that the user equipment can initiate an uplink request in the area where it is currently located.

In this implementation, the user equipment further includes a processing module 33 is configured to trigger the transmitting module 31 to transmit the uplink request message, upon determining that a trigger condition is satisfied, where the trigger condition includes at least one of the following conditions.

The user equipment needs to transmit traffic; the user equipment obtains the privilege information; traffic to be transmitted by the user equipment is preset traffic; the third access node cannot satisfy a traffic transmission demand of the user equipment; the user equipment has the capacity to initiate an uplink request; and the position of the user equipment is changed.

In this implementation, the transmitting module 31 is configured to transmit the uplink request message at a preset periodicity.

Furthermore the user equipment further includes a processing module 33 configured to trigger the transmitting module 31 to suspend the uplink request message from being transmitted, after the receiving module 32 receives the common information transmitted by the first access node; and upon determining that the position of the user equipment is changed, to determine that the trigger condition is satisfied, and to trigger the transmitting module 31 to transmit the uplink request message at the preset periodicity.

In this implementation, the transmitting module 31 is configured to transmit the uplink request message according to preset configuration information; or to transmit the uplink request message according to configuration information in the common information transmitted by the third access node; where the configuration information includes: a time-frequency resource for transmitting an uplink request, and parameter information to be used in transmitting the uplink request.

In this implementation, the receiving module 32 is configured to receive the common information transmitted by the first access node at a preset time-frequency resource; or to receive the common information transmitted by the first access node at a time-frequency resource scheduled by the first access node; or to receive the common information transmitted by the first access node at a time-frequency resource scheduled by the third access node.

Further to any one of the embodiments above, the transmitting module 31 is configured to transmit the uplink request message via dedicated signaling; or to transmit the uplink request message via a message Msg1.

Further to any one of the embodiments above, the receiving module 32 is configured to receive the common information transmitted by the first access node via dedicated signaling; or to receive the common information transmitted by the first access node via Msg2; or to receive the common information transmitted by the first access node via Msg4.

Figure 4:
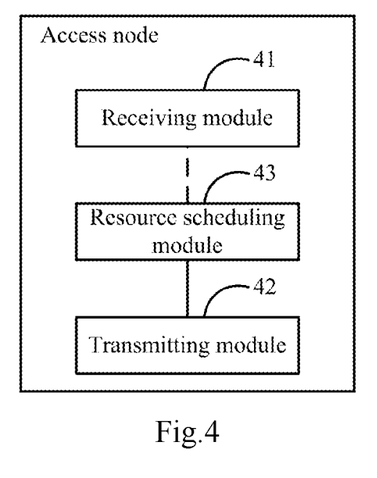
FIG. 4 is a schematic structural diagram of a first access node according to an embodiment of the invention.

FIG. 4 illustrates an access node according to an embodiment of the invention, which can perform the method according to the embodiment of the invention as illustrated in FIG. 2, and as illustrated in FIG. 4, the access node includes: a receiving module 41 is configured to receive an uplink request message transmitted by a user equipment, where the uplink request message requests for common information of the access node including the receiving module; and a transmitting module 42 is configured to transmit the common information requested in the uplink request message.

Optionally the receiving module 41 is configured to receive the uplink request message transmitted by the user equipment over a preset time-frequency resource; or to receive the uplink request message transmitted by the user equipment over a time-frequency resource indicated by a second access node, where the second access node is an access node currently providing the user equipment with a communication service; or to receive the uplink request message transmitted by the user equipment over a time-frequency resource indicated by a third access node, where the third access node is an access node where the user equipment currently resides.

Optionally the receiving module 41 is configured to receive the uplink request message transmitted by the user equipment via dedicated signaling; or to receive the uplink request message transmitted by the user equipment via a message Msg1.

Optionally the transmitting module 42 is configured to transmit the common information requested in the uplink request message to the user equipment; or to transmit the common information requested in the uplink request message by broadcasting the common information.

Optionally the transmitting module 42 is configured to transmit the common information requested in the uplink request message via dedicated signaling; or to transmit the common information requested in the uplink request message via Msg2; or to transmit the common information requested in the uplink request message via Msg4.

Optionally the access node further includes a resource scheduling module 43 is configured to schedule for the user equipment a time-frequency resource for the user equipment to receive the common information.

Figure 5:
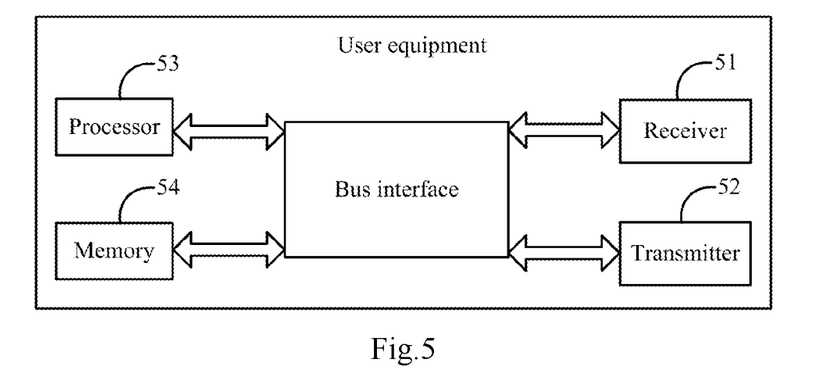
FIG. 5 is a schematic structural diagram of a second user equipment according to an embodiment of the invention.

The structure of and processing in the user equipment according to the embodiment of the invention will be described below in connection with an optional hardware structure thereof. FIG. 5 illustrates a user equipment according to an embodiment of the invention, which can perform the method according to the embodiment of the invention as illustrated in FIG. 1.

In the embodiment illustrated in FIG. 5, the user equipment includes a receiver 51, a transmitter 52, and at least one processor 53 connected respectively with the receiver 51 and the transmitter 52.

The transmitter 52 is configured to transmit an uplink request message, where the uplink request message requests for common information of a first access node in an area where the user equipment is located.

The receiver 51 is configured to receive the common information transmitted by the first access node.

Here in FIG. 5, the bus architecture can include any number of interconnecting buses and bridges to particularly link together various circuits including one or more processors represented by the processor 53, and one or more memories represented by a memory 54. The bus architecture can further link together various other circuits, e.g., prophetical devices, manostats, power management circuits, etc., all of which are well known in the art, so a further description thereof will be omitted in this context. A bus interface serves as an interface. The receiver 51 and the transmitter 52 provide units for communication with various other devices over a transmission medium. The processor 53 is responsible for managing the bus architecture and performing normal processes, and the memory 504 can store data for use by the processor 503 in performing the operations.

In an optional implementation, the user equipment is in a connected state, a second access node provides the user equipment with a communication service, and a coverage area of the second access node partially or completely overlaps with a coverage area of the first access node; and the receiver 51 is further configured to receive control signaling transmitted by the second access node, where the control signaling instructs the user equipment to initiate an uplink request.

In this implementation, the transmitter 52 is configured to transmit the uplink request message according to preset configuration information; or to transmit the uplink request message according to configuration information in common information transmitted by the second access node; or to transmit the uplink request message according to configuration information carried in the controlling signaling; where the configuration information includes: a time-frequency resource for transmitting an uplink request, and parameter information to be used in transmitting the uplink request.

In this implementation, the receiver 51 is configured to receive the common information transmitted by the first access node over a preset time-frequency resource; or to receive the common information transmitted by the first access node over a time-frequency resource scheduled by the first access node; or to receive the common information transmitted by the first access node over a time-frequency resource scheduled by the second access node.

In another optional implementation, the user equipment is in an idle state; and the user equipment currently resides at a third access node, or the user equipment currently resides in a virtual cell including at least two third access nodes.

The receiver 51 is further configured: to receive common information transmitted by the third access node, and to obtain, from the received common information, privilege information indicating that the user equipment can initiate an uplink request in the area where it is currently located.

In this implementation, the user equipment further includes a processor 53 is configured to trigger the transmitter 52 to transmit the uplink request message, upon determining that a trigger condition is satisfied, where the trigger condition includes at least one of the following conditions.

The user equipment needs to transmit traffic; the user equipment obtains the privilege information; traffic to be transmitted by the user equipment is preset traffic; the third access node cannot satisfy a traffic transmission demand of the user equipment; the user equipment has the capacity to initiate an uplink request; and the position of the user equipment is changed.

In this implementation, the transmitter 52 is configured to transmit the uplink request message at a preset periodicity.

Furthermore the processor 53 is configured to trigger the transmitter 52 to suspend the uplink request message from being transmitted, after the receiver 51 receives the common information transmitted by the first access node; and upon determining that the position of the user equipment is changed, to determine that the trigger condition is satisfied, and to trigger the transmitting module 31 to transmit the uplink request message at the preset periodicity.

In this implementation, the transmitter 52 is configured to transmit the uplink request message according to preset configuration information; or to transmit the uplink request message according to configuration information in the common information transmitted by the third access node; where the configuration information includes: a time-frequency resource for transmitting an uplink request, and parameter information to be used in transmitting the uplink request.

In this implementation, the receiver 51 is configured to receive the common information transmitted by the first access node at a preset time-frequency resource; or to receive the common information transmitted by the first access node at a time-frequency resource scheduled by the first access node; or to receive the common information transmitted by the first access node at a time-frequency resource scheduled by the third access node.

Further to any one of the embodiments above, the transmitter 52 is configured to transmit the uplink request message via dedicated signaling; or to transmit the uplink request message via a message Msg1.

Further to any one of the embodiments above, the receiver 51 is configured to receive the common information transmitted by the first access node via dedicated signaling; or to receive the common information transmitted by the first access node via Msg2; or to receive the common information transmitted by the first access node via Msg4.

Figure 6:
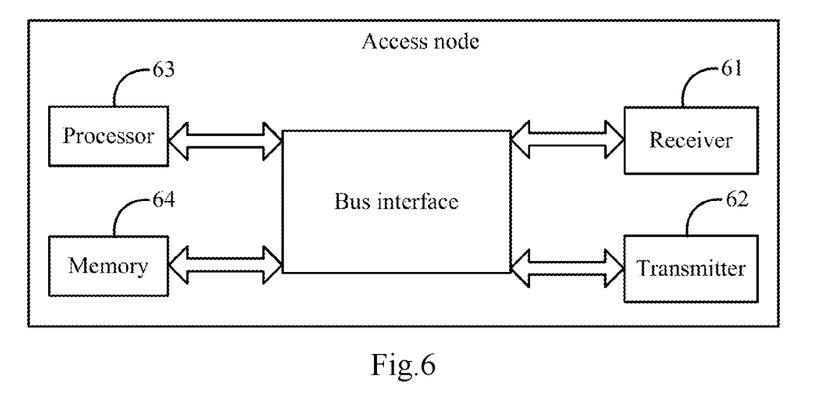
FIG. 6 is a schematic structural diagram of a second access node according to an embodiment of the invention.

The structure of and processing in the access node according to the embodiment of the invention will be described below in connection with an optional hardware structure thereof. FIG. 6 illustrates an access node according to an embodiment of the invention, which can perform the method according to the embodiment of the invention as illustrated in FIG. 2.

In the embodiment illustrated in FIG. 6, the access node includes a receiver 61, a transmitter 62, and at least one processor 63 connected respectively with the receiver 61 and the transmitter 62.

The receiver 61 is configured to receive an uplink request message transmitted by a user equipment, where the uplink request message requests for common information of the access node including the receiver.

The transmitter 62 is configured to transmit the common information requested in the uplink request message.

Here in FIG. 6, the bus architecture can include any number of interconnecting buses and bridges to particularly link together various circuits including one or more processors represented by the processor 63, and one or more memories represented by a memory 64. The bus architecture can further link together various other circuits, e.g., prophetical devices, manostats, power management circuits, etc., all of which are well known in the art, so a further description thereof will be omitted in this context. A bus interface serves as an interface. The receiver 61 and the transmitter 62 provide units for communication with various other devices over a transmission medium. The processor 63 is responsible for managing the bus architecture and performing normal processes, and the memory 64 can store data for use by the processor 503 in performing the operations.

Optionally the receiver 61 is configured to receive the uplink request message transmitted by the user equipment over a preset time-frequency resource; or to receive the uplink request message transmitted by the user equipment over a time-frequency resource indicated by a second access node, where the second access node is an access node currently providing the user equipment with a communication service; or to receive the uplink request message transmitted by the user equipment over a time-frequency resource indicated by a third access node, where the third access node is an access node where the user equipment currently resides.

Optionally the receiver 61 is configured to receive the uplink request message transmitted by the user equipment via dedicated signaling; or to receive the uplink request message transmitted by the user equipment via a message Msg1.

Optionally the transmitter 62 is configured to transmit the common information requested in the uplink request message to the user equipment; or to transmit the common information requested in the uplink request message by broadcasting the common information.

Optionally the transmitter 62 is configured to transmit the common information requested in the uplink request message via dedicated signaling; or to transmit the common information requested in the uplink request message via Msg2; or to transmit the common information requested in the uplink request message via Msg4.

Optionally the processor is configured to schedule for the user equipment a time-frequency resource for the user equipment to receive the common information.

Figure 7:
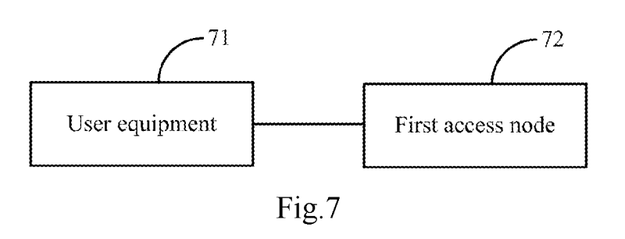
FIG. 7 is a schematic structural diagram of a communication system according to an embodiment of the invention.

An embodiment of the invention further provides a communication system including a user equipment, which can perform the method according to the embodiment of the invention as illustrated in FIG. 1, and a first access node, which can perform the method according to the embodiment of the invention as illustrated in FIG. 2, and as illustrated in FIG. 7, the system includes a user equipment 71 is configured to transmit an uplink request message, where the uplink request message requests for common information of a first access node in an area where the user equipment is located; and to receive the common information transmitted by the first access node; and a first access node 72 is configured to receive the uplink request message transmitted by the user equipment, where the uplink request message requests for the common information of the first access node; and to transmit the common information requested in the uplink request message.

In an optional implementation, if the user equipment is in a connected state, then the system will further include a second access node currently providing the user equipment with a communication service, configured to transmit control signaling to the user equipment upon determining that at least one trigger condition is satisfied.

The user equipment is configured to transmit the uplink request message upon reception of the control signaling transmitted by the second access node;

Where the at least one trigger condition includes: the second access node determines that there is the first access node in the area where the user equipment is located; the second access node determines that it cannot satisfy a traffic transmission demand of the user equipment; and the second access node receives a report message of the first access node in the area where the user equipment is located, where the report message indicates that the user equipment is located in a coverage area of the first access node.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data, comprising:
   transmitting, by a user equipment, an uplink request message, wherein the uplink request message requests common information of a first access node in an area where the user equipment is located; and
   receiving, by the user equipment, the common information transmitted by the first access node; wherein
   the user equipment is in a connected state, a second access node provides the user equipment with a communication service, and the user equipment currently resides in a coverage area of the first access node; and before the user equipment transmits the uplink request message, the method further comprises:
   receiving, by the user equipment, control signaling transmitted by the second access node, wherein the control signaling instructs the user equipment to initiate an uplink request;
   wherein the second node transmits the control signaling to the user equipment upon determining that at least one trigger condition is satisfied, and the at least one trigger condition comprises:
   the second access node determining that it cannot satisfy a traffic transmission demand of the user equipment, or
   the second access node receiving a report message indicating that the user equipment resides in the coverage area of the first access node from the first access node;
   in response to the user equipment is in the connected state, the second access node provides the user equipment with the communication service, and the user equipment currently resides in the coverage area of the first access node, transmitting, by the user equipment, the uplink request message comprises:
   transmitting, by the user equipment, the uplink request message according to preset configuration information; or
   transmitting, by the user equipment, the uplink request message according to configuration information in common information transmitted by the second access node; or
   transmitting, by the user equipment, the uplink request message according to configuration information carried in the control signaling;
   wherein the configuration information comprises: a time-frequency resource for transmitting an uplink request, and parameter information to be used in transmitting the uplink request;
   wherein the uplink request message is transmitted via a message Msg1, wherein the message Msg1 is a first message in a random access procedure with contention, used to request common information of the first access node in the area where the user equipment is located, and used to request an uplink grant and synchronization.

2. The method according to claim 1, wherein receiving, by the user equipment, the common information transmitted by the first access node comprises:
   receiving, by the user equipment, the common information transmitted by the first access node over a preset time-frequency resource; or
   receiving, by the user equipment, the common information transmitted by the first access node over a time-frequency resource scheduled by the first access node.

3. The method according to claim 1, wherein in response to the user equipment is in the connected state, the second access node provides the user equipment with the communication service, and the user equipment currently resides in the coverage area of the first access node, receiving, by the user equipment, the common information transmitted by the first access node comprises:
   receiving, by the user equipment, the common information transmitted by the first access node over a preset time-frequency resource; or
   receiving, by the user equipment, the common information transmitted by the first access node over a time-frequency resource scheduled by the first access node; or
   receiving, by the user equipment, the common information transmitted by the first access node over a time-frequency resource scheduled by the second access node.

4. The method according to claim 1, wherein receiving, by the user equipment, the common information transmitted by the first access node comprises:
   receiving, by the user equipment, the common information transmitted by the first access node via dedicated signaling; or
   receiving, by the user equipment, the common information transmitted by the first access node via a message Msg2; or
   receiving, by the user equipment, the common information transmitted by the first access node via a message Msg4;
   wherein the message Msg2 is a second message in a random access procedure with contention, and the message Msg4 is a fourth message in the random access procedure with contention.

5. The method according to claim 1, wherein the uplink request message comprises identification information identifying a type of common information requested by the user equipment.

6. A user equipment, comprising:
   a receiver, a transmitter, a processor, and a memory, wherein:
   the transmitter is configured to transmit an uplink request message, wherein the uplink request message requests common information of a first access node in an area where the user equipment is located;
   the receiver is configured to receive the common information transmitted by the first access node; and
   the memory is configured to store data to be used by the processor in performing operations; wherein
   the user equipment is in a connected state, a second access node provides the user equipment with a communication service, and the user equipment currently resides in a coverage area of the first access node; and before the transmitter transmits the uplink request message, the receiver is further configured to:

receive control signaling transmitted by the second access node, wherein the control signaling instructs the user equipment to initiate an uplink request;

wherein the second node transmits the control signaling to the user equipment upon determining that at least one trigger condition is satisfied, and the at least one trigger condition comprises:

the second access node determining that it cannot satisfy a traffic transmission demand of the user equipment, or the second access node receiving a report message indicating that the user equipment resides in the coverage area of the first access node from the first access node;

in response to the user equipment is in the connected state, the second access node provides the user equipment with the communication service, and the user equipment currently resides in the coverage area of the first access node, the transmitter is further configured to:

transmit the uplink request message according to preset configuration information; or transmit the uplink request message according to configuration information in common information transmitted by the second access node; or transmit the uplink request message according to configuration information carried in the control signaling;

wherein the configuration information comprises: a time-frequency resource for transmitting an uplink request, and parameter information to be used in transmitting the uplink request;

the transmitter is configured to transmit an uplink request message via a message Msg1, wherein the message Msg1 is a first message in a random access procedure with contention, used to request for common information of the first access node in the area where the user equipment is located, and used to request an uplink grant, and synchronization.

* * * * *